United States Patent [19]

Ferranti et al.

[11] Patent Number: 5,076,517
[45] Date of Patent: Dec. 31, 1991

[54] PROGRAMMABLE, LINEAR COLLECTIVE CONTROL SYSTEM FOR A HELICOPTER

[75] Inventors: Michael J. Ferranti, Naugatuck; Ari M. Novis, Rocky Hill; Ronald A. Durno, Trumbull, all of Conn.

[73] Assignee: United Technologies Corporation, Hartford, Conn.

[21] Appl. No.: 393,346

[22] Filed: Aug. 14, 1989

[51] Int. Cl.⁵ .................... B64C 13/46; B64C 13/50
[52] U.S. Cl. .................... 244/228; 244/234; 244/236; 244/223; 74/471 XY
[58] Field of Search ............... 244/223, 228, 232, 233, 244/234, 236, 237, 233, 196, 197; 74/471 XY, 89.2, 89.22

[56] References Cited

U.S. PATENT DOCUMENTS

| | | | |
|---|---|---|---|
| 1,840,643 | 1/1932 | Stout | 244/234 |
| 1,859,716 | 5/1932 | Rutrle | 244/234 |
| 3,762,232 | 10/1973 | Müller | 74/89.22 |
| 4,420,808 | 12/1983 | Diamond et al. | 244/223 |
| 4,537,084 | 8/1985 | Passemard et al. | 74/471 XY |
| 4,574,651 | 3/1986 | Nordström | 244/234 |
| 4,600,083 | 7/1986 | Parent et al. | 74/89.22 |
| 4,651,954 | 3/1987 | Miller | 244/234 |
| 4,696,445 | 9/1987 | Wright et al. | 244/223 |
| 4,716,399 | 12/1987 | Nordlund | 74/471 XY |
| 4,865,277 | 9/1989 | Smith et al. | 74/471 XY |
| 4,934,202 | 6/1990 | Hikita et al. | 74/89.2 |

Primary Examiner—Peters, Jr. Joseph F.
Assistant Examiner—Bidwell Anne E.

[57] ABSTRACT

A helicopter programmable collective control system includes a motorized collective control stick 2 used in conjunction with a multi-axis control stick 30, with the multi-axis control stick 30 as the default collective controller. A collective control signal processor reads collective input the pilot is giving through one of the two control sticks 2, 30 and provides a motor drive signal 44 (which is dampened to prevent over control) to position the collective control stick 3. The collective control stick position is used to drive the rotor collective pitch actuators 16.

11 Claims, 5 Drawing Sheets

PROGRAMMABLE, LINEAR COLLECTIVE CONTROL SYSTEM FOR A HELICOPTER

DESCRIPTION

1. Technical Field

This invention relates to a collective control system for a helicopter and more particularly a programmable collective control system with tactile feedback and with a linear, motorized stick.

2. Background Art

Traditional helicopter flight control systems utilized a cyclic stick for pitch and roll, pedals for yaw and a collective stick for lift. Commonly owned U.S. Pat. No. 4,420,808 (Diamond et al, 1983) discloses a single, multi-axis sidearm control stick that provides control signals in each of the pitch, roll, yaw and collective/lift axes and therefore allows a helicopter to be flown using only one hand. The multi-axis stick detects the amount of force applied in different axes by the pilot and provides signals which are a function of those forces. The stick has limited displacement, which is necessary to eliminate coupling between axes due to hand motion.

Collective axis tasks, such as nap-of-the-earth (NOE) flight operations, create difficulty for pilots when using only a multi-axis control stick, because they cannot accurately perceive the extent of collective (lift) input without diverting attention to the cockpit display.

Commonly owned U.S. Pat. No. 4,696,445 (Wright et al, 1987) discloses a displacement-type collective control stick used in conjunction with a force-type multi-axis sidearm control stick to solve this problem. In Wright et al, the collective stick "tracks" the multi-axis stick using a motor/clutch/damper/spring arrangement so that a pilot determines the collective pitch of the rotor by the position of the collective stick and can change rotor pitch using either the multi-axis stick or the collective stick. The signal from the multi-axis stick controls rotor collective pitch until the pilot engages the collective stick. The pilot engages the collective stick in two ways: pushing the stick against it's trim position or pressing a trim release switch on the stick. A clutch mechanism subsequently disengages the stick drive motor and allows the pilot to move the stick, the displacement of which is then used as the collective pitch command signal.

Prior collective sticks, such as disclosed in Wright, are pivotally attached to the floor of the aircraft and provide a control signal indicative of angular displacement. The sensitivity of collective control is dependent on the length of the stick. Subsequently, prior systems had long collective control sticks requiring significant pilot motion to control the aircraft which added to pilot fatigue.

Wright et al provides rotor collective pitch tactile feedback to the pilot because the collective stick "tracks" the multi-axis stick. The Wright et al stick does not, however, provide the pilot with tactile feedback as to the rotor load requirement for collective stick commands. In other words, the pilot is not provided with feedback as to the amount of stress he is putting on the rotor due to the command he is giving through the collective stick. For example, a pilot can move the stick its full length of travel very quickly, causing the helicopter to stall momentarily due to the sudden demand for a large change in energy state. A stall is discomforting to the pilot and is particularly undesirable if he is reacting to an emergency situation which demands short time response, such as discovery that an adversary is about to fire a weapon at him.

Damping systems are disclosed in the prior art for helping to prevent pilot errors as described above. For instance, U.S. Pat. No. 4,545,322 (Yang 1985) describes a mechanical device for artificially creating drag on a control stick. U.S. Pat. No. 4,477,043 (Repperger 1984) discloses a mechanical damping system which is controlled by using a motor or actuator to adjust spring tension U S. Pat. No. 4,236,685 (Kissel 1980) discloses an aircraft steering mechanism with active force feedback. Kissel describes using discreet components to read various dynamic inputs from aircraft flight conditions, interpret those inputs and increase the tension on the flight control stick using a "pitch feel" unit.

It has also been discovered that every pilot desires a different resistance or "feel" in the collective stick movement. Some pilots like to have a "touchy" stick while others prefer the stick to be more difficult to move. The prior mentioned control stick systems have required laborious adjustments to tailor their "feel" to pilot demands while minimizing pilot fatigue.

DISCLOSURE OF THE INVENTION

An object of the present invention is to provide an improved collective control system for a helicopter which provides tactile feedback as to collective pitch.

Another object is to provide a collective control system which is programmable for different pilot requirements and flight profiles.

Yet another object of the invention is to provide a collective control system which provides damping to prevent pilot induced oscillations.

A further object of the present invention is to provide an improved motorized collective control stick for a helicopter which is easily programmable, thereby eliminating the need for traditional stick clutch/damper/spring arrangements.

According to the present invention, a programmable, motorized, collective control stick system is used in tandem with a multi-axis control stick system for controlling the collective pitch of a helicopter rotor. The collective control stick has a force output (proportional to the amount of force placed on the stick) and a displacement output (proportional to the position of the stick). A collective system signal processor reads the collective control stick output signals, the force output of the multi-axis control stick, flight data from a flight system control computer, and various other data, and provides a drive signal for the drive motor of the collective control stick. The stick is moved by the motor at a rate controlled by the computer so as not to exceed the limitations of the helicopter. The displacement output of the collective control stick is used to drive electro-hydraulic actuators which control the collective pitch of the rotor.

According further to the present invention, a sliding stick is mounted on a bearing block which rides on dual shafts contained in a collective control box. The bearing block is attached to a belt driven by pulleys and a motor. The motor is controlled by a signal processor which provides a motor drive signal indicative of the pilot's desire to change rotor collective pitch.

The invention provides for simple adjustment to change the "feel" of the collective stick for different pilots' requirements. This may be done using hardware (potentiometers, etc.), software (pilot profile disk, etc.) or through the flight control computer.

The invention has a small operational range which helps prevent pilot fatigue. It eliminates a clutching mechanism and provides positive drive of the collective stick without slippage. It is lighter, simpler in operation and has less parts to wear out than prior systems.

The invention has a smaller length of travel and better accuracy than previous systems, allowing the stick to travel its operative length in one second or less.

The invention allows the damping of the collective stick to be dynamically adjusted as a function of stick rate, position limits, rotor load, environmental conditions, mission profile, vertical acceleration, pitch rate and many other inputs. As a result, the invention helps prevent pilot induced oscillations, it ensures the engine operates within its acceleration curve and it improves aircraft efficiency. Also, the invention can be current limited to provide motor circuit protection.

These and other objects, features and advantages of the present invention will become more apparent in the light of the detailed description of exemplary embodiments thereof as illustrated in the drawing.

BEST MODE FOR CARRYING OUT THE INVENTION

Figure 1:
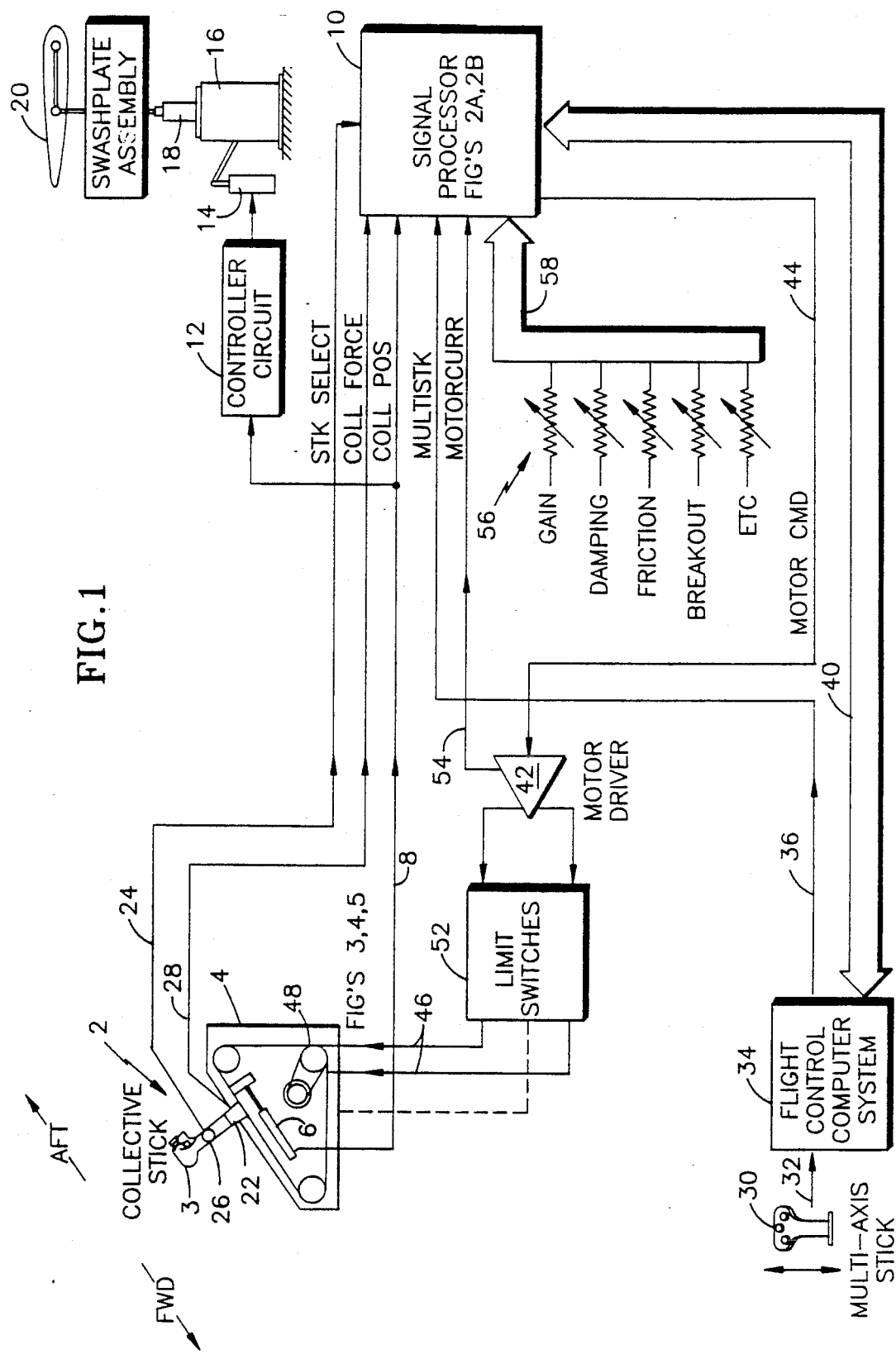
FIG. 1 is a simplified schematic block diagram of a programmable collective control system in accordance with the present invention.

Referring now to FIG. 1, a motorized, sliding, collective control stick 2 has a grip 3, which is mounted on a collective control box 4, as is described with respect to FIGS. 3-5 hereinafter. The position of the collective control stick along its axis is converted to an electrical signal by a linear variable differential transformer 6, (LVDT, shown in greater detail in FIGS. 3-5 hereinafter), which is connected by a line 8 to a signal processor 10. The position signal (COLLPOS) on line 8 is also connected to a controller circuit 12 for an electrohydraulic actuator 14 which controls a primary actuator 16 that positions a swashplate assembly 18 to determine the collective pitch of the helicopter rotor blades 20. The force applied by the pilot to the grip 3 is converted to an electrical signal (COLLFORCE) by a force transducer 22, such as a strain gauge, and connected by a line 28 to the signal processor 10. Also, the output of a select switch 26, placed on the grip 3, is connected by a line 24 to the signal processor 10.

A multi-axis control stick 30, such as described in Diamond et al, provides a collective force output signal on a line 32 which is utilized by a flight control computer system 34 to provide an appropriate multi-axis stick collective control signal (MULTISTK) that is connected by a line 36 to the signal processor 10. The flight control computer system 34 also exchanges data with the signal processor 10 on a data bus 40.

The signal processor 10 utilizes the inputs on lines 8, 24, 28, 36, 40 and provides a motor command (MOTOR CMD) signal to a motor driver circuit 42 on a line 44. The motor driver circuit 42 provides a drive signal on lines 46 to a collective stick motor 48. The collective stick motor 48 positions the grip 3 using a pulley arrangement (shown in greater detail in FIGS. 3-5 hereinafter). Mechanical limit switches 52, located on the collective control box 4, disconnect the motor drive signal 46 from the motor driver circuit 42 if the grip 3 reaches its travel limits.

The signal processor performs a number of calculations in order to provide the motor command signal. (These calculations are described in FIGS. 2A and B hereinafter.) Variables in these calculations provide flexibility in the operation of the collective stick. For example, the gain of the signal processor provides the sensitivity or "feel" of the stick. Higher gain makes the stick more sensitive to pilot commands so that small applied forces result in large rotor collective pitch changes while lower gain has the opposite effect. The variables may be provided through adjustments to potentiometers 56 in external circuitry which provide signals on lines 58.

Figure 2A:
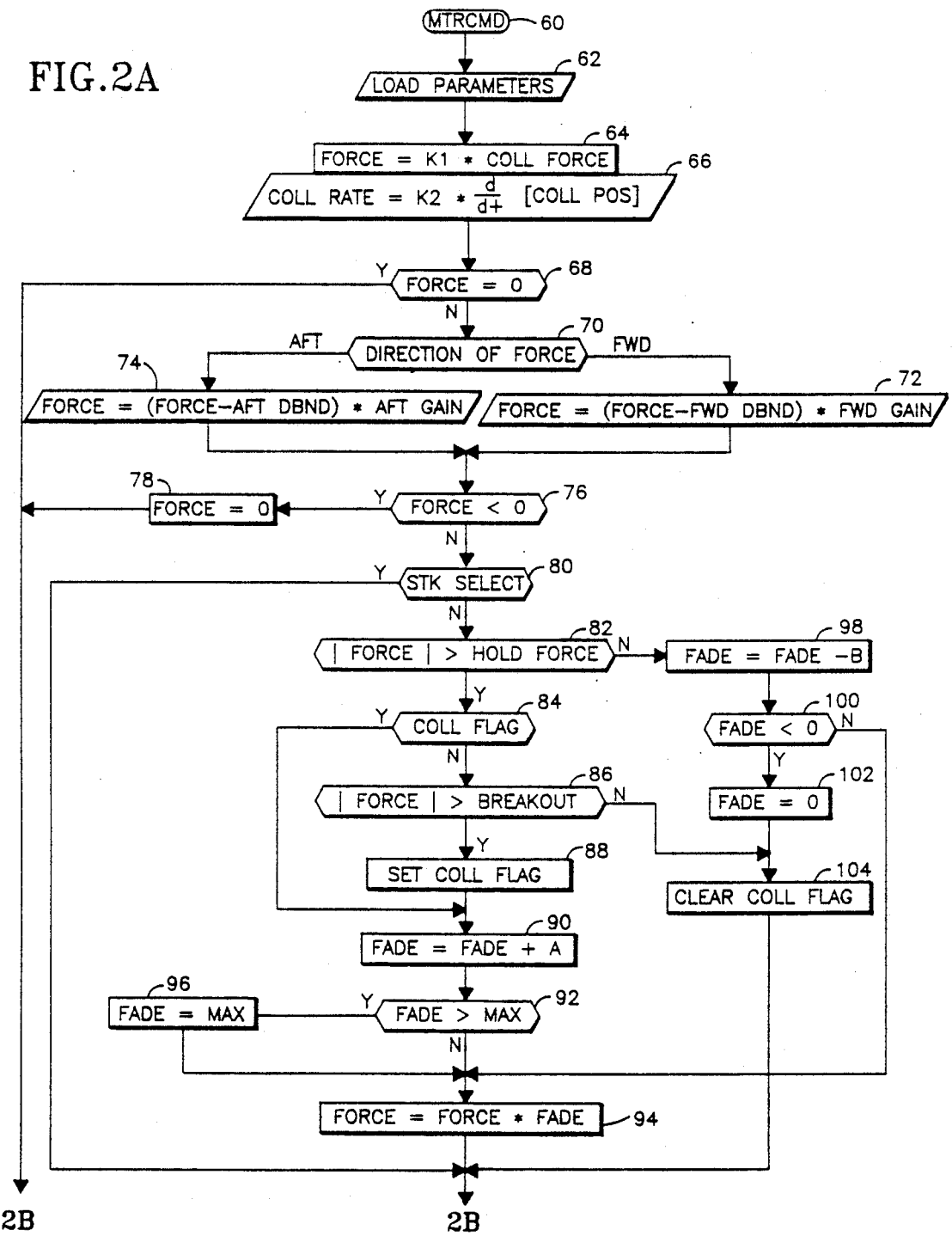
FIGS. 2A, 2B are a logic flowchart illustrative of a program stored in memory for providing the signal processing in the embodiment of FIG. 1.

Referring now to FIG. 2A, a motor command calculation routine is stored in the memory of a digital signal processor and reached through entry point 60. A LOAD PARAMETER subroutine 62 loads collective control system variable parameters into memory for use during forthcoming calculations. The variable PARAMETERS are provided from a number of sources such as the analog signals on lines 58 of FIG. 1, and digital signals provided by the flight control computer system 34 on data bus 40. PARAMETERS include variables which are provided for each pilot's specific requirements for collective system responsiveness (e.g., the "feel" of the stick may be programmed this way) and also variables which are used to adjust for dynamic flight conditions. The LOAD PARAMETERS subroutine 62 is not shown in detail herein, but may be one of many subroutines known in the art which poles input devices and stores the output data from each device in memory for retrieval during forthcoming calculations.

A step 64 defines a FORCE parameter as the COLLFORCE signal provided by line 28 of FIG. 1 times a gain K1. This step provides the "feel" of the collective control stick because different values of K1 provide a different responsiveness of the stick. Next, a subroutine 66 defines a COLLRATE parameter as a gain K2 times the differential of the COLLPOS parameter provided on line 8 of FIG. 1. The COLLRATE subroutine is not shown in detail herein but may be any one of a number of programs known in the art to differentiate a parameter with respect to time. Test 68 determines whether or not FORCE is being provided. If so, a test 70 determines its direction. If FORCE is in the forward direction, (FWD), then FORCE is redefined by subtracting a forward deadband (FWDDBND) from FORCE and multiplying this value by a forward gain parameter (FWDGAIN) in a subroutine 72. If the direction of FORCE is aft (AFT), then a subroutine 74 redefines FORCE as FORCE minus an aft deadband (AFTDBAND) multiplied by an aft gain value (AFTGAIN). FWDDBND and AFTDBND create a deadband which prevents helicopter vibrations and noise from causing extraneous motor command signals.

FWDGAIN and AFTGAIN are parameters which allow the feel of the collective stick 2 to be different for forward and aft movement. Test 76 determines if FORCE is greater than the deadband (manifested by the fact that FORCE will be a negative number at this point if FORCE is less than AFTDBND or FWDDBND). If it isn't, step 78 sets FORCE equal to zero to eliminate any motor command. If FORCE is greater than the deadband, test 80 determines if the pilot has engaged the select switch 26 on the grip 3.

A negative result of test 80 indicates the pilot has not engaged the select switch on the grip and the force applied to the grip will be faded in/out over time as described in steps 82-104 hereinafter. An affirmative result to test 80 indicates the pilot has engaged the select switch and therefore does not wish the force to be faded in/out but rather any input he gives to the collective stick will be used immediately for collective control. In essence, engaging the select switch makes the collective stick more "touchy" because the control does not undergo the fade in/out function. The select switch is used by the pilot under circumstances in which he wants instantaneous response from his commands through the collective stick.

If the pilot wishes to use the collective stick without engaging the select switch he must apply enough force to the grip to first overcome a breakout level (BREAKOUT) and then maintain that force above a threshold value (HOLDFORCE). Test 82 determines if FORCE is greater than HOLDFORCE. If it is, test 84 determines if a collective flag (indicating the breakout level was previously exceeded) has been set. A negative result of test 84 leads to test 86 to determine if FORCE has exceeded the breakout level. If it has, the collective flag is set in step 88 and a step 90 increments a FADE parameter (originally initialized to zero) by an incremental value A. Test 92 then determines if FADE is greater than a maximum value, and if so, step 96 sets FADE equal to the maximum value. In either case step 94 redefines FORCE as FORCE times FADE.

If the pilot continues to apply force to the collective stick greater than BREAKOUT, the fade in/out routine (steps 82-94) increases FORCE as a function of incremental value A (in subsequent passes through the routine of FIG. 2A) until FADE is the maximum value as set in step 96. The collective stick remains engaged as the collective pitch controller until the pilot relieves the pressure he is applying to the grip below HOLDFORCE as determined in test 82. If FORCE is below HOLDFORCE, step 98 redefines FADE as FADE minus an incremental value B. Test 100 then determines if FADE is less than zero. If not, FORCE is redefined as FORCE times the new FADE value in step 94. FORCE continues to be faded out (in subsequent passes) as a function of B until test 100 determines that FADE has been decremented below zero. Step 102 then redefines FADE as zero, step 104 clears the collective flag and the routine is exited with FORCE having been faded out to zero.

Figure 2B:
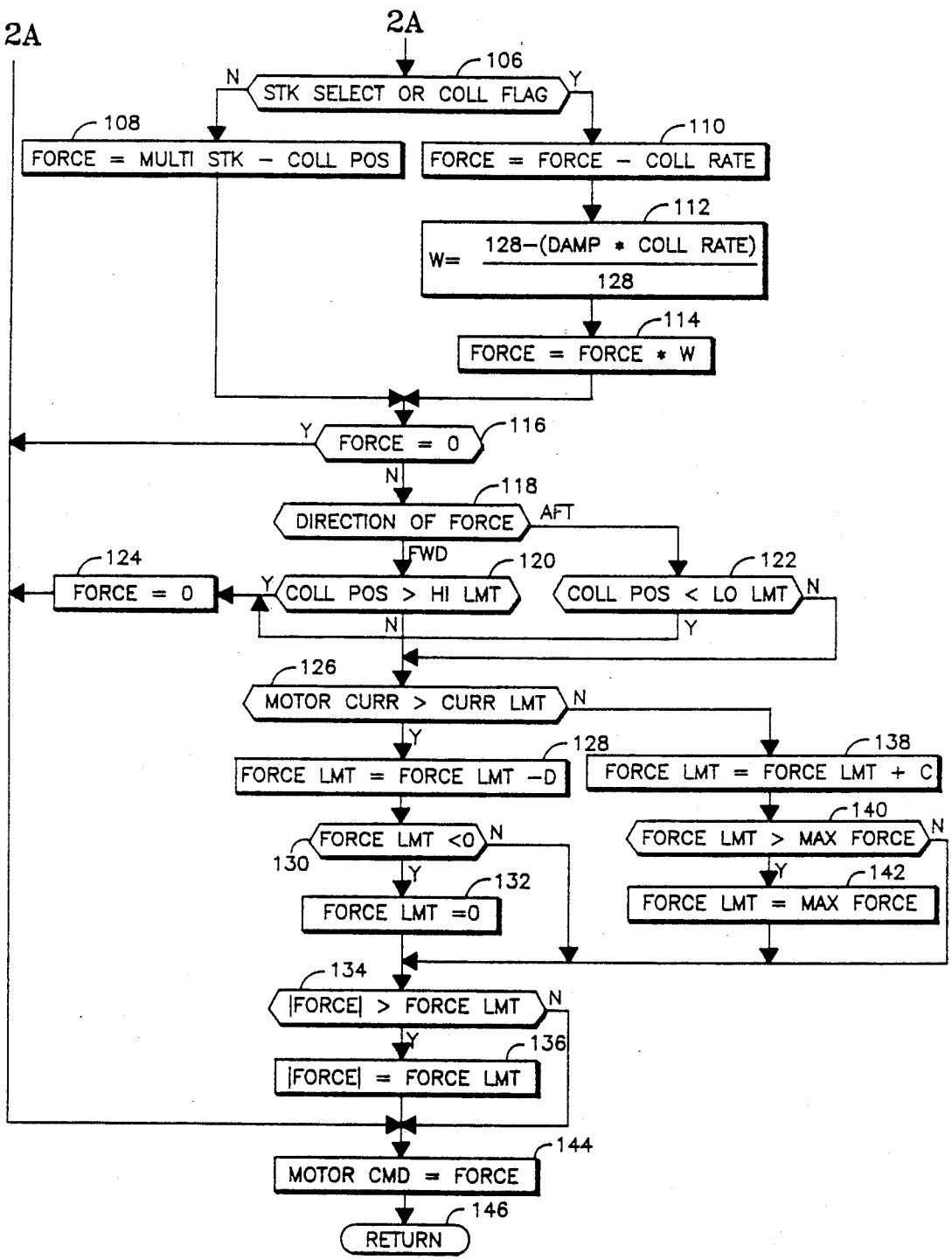

Referring now to FIG. 2B, test 106 determines if either the select switch has been engaged (yes answer to test 80) or the collective flag has been set in step 88. An affirmative result means the pilot has selected the collective stick to control rotor collective pitch and FORCE is redefined as FORCE minus the COLLRATE parameter determined in step 66. It has been found the collective stick has a tendency to "run away" from the pilot as he applies force to the grip. The subtraction performed in step 110 prevents this from happening.

Step 112 defines a damping multiplier parameter W which has a value that varies between zero and one. Step 114 then redefines FORCE as FORCE times W. W is dependent on COLLRATE and a DAMP parameter. The derivation of DAMP is not explicitly defined herein, but it may be programmed to be dependent on any number of factors including specific dynamic flight conditions (e.g. rotor loading), mission profile, and pilot preference. These factors are manifested as parameters stored in memory and may be provided by the flight control computer 34. For example, it is undesirable to get lift from the helicopter rotor during a pure rotational manuever. To prevent the pilot from giving a collective lift command through the collective control stick 2, the attitude of the helicopter might be measured by a gyro type transducer and read by the flight control computer 34 which would provide the signal processor 10 with a scaled value (on data bus 40) of the amount of rotation the helicopter is undergoing. The signal processor would incorporate that value in its computation of DAMP. As DAMP becomes a larger value, W becomes smaller in step 112. FORCE is then reduced in step 114 and the collective control stick becomes harder, if not impossible to move. It is evident that a variety of parameters can be utilized to dampen the collective control stick in this manner.

If test 106 has determined the pilot has not engaged the collective stick, step 108 redefines FORCE as an error signal equal to the collective control signal (MULTISTK, line 36 FIG. 1) provided by the multi-axis stick 30 minus the collective stick position signal (COLLPOS).

Test 116 determines if FORCE is equal to zero. If so, the routine jumps to step 144. If not, test 118 determines the direction of FORCE. If the pilot is pushing the collective stick forward, test 120 determines whether the collective stick position signal (COLLPOS) exceeds limit HILMT. If test 118 determines the pilot is pulling the collective stick in the aft direction, test 122 determines whether COLLPOS exceeds limit LOLMT. If the collective stick is beyond its limits in either test 120 or 122, step 124 redefines FORCE as zero. Steps 118-124 therefore establish a position limit routine whereby if the forward or aft position limits are exceeded, the pilot is able to command the stick in the opposite direction of the limit that has been exceeded.

Steps and tests 126-142 described hereinafter provide a means for keeping the collective stick motor current draw to within safe operating limits. The motor current signal MOTORCURR provided on line 54 of FIG. 1 is compared with a current limit parameter CURRLMT in test 126. If MOTORCURR exceeds CURRLMT, a FORCELMT parameter (originally initialized to MAXFORCE) is decremented by a value D in step 128. Test 130 determines if FORCELMT is negative. If FORCELMT is negative, step 132 sets it equal to 0. If not, test 134 determines if FORCE is greater than FORCELMT. If test 134 is affirmative, FORCE is set equal to FORCELMT in step 136. If FORCE was not greater than FORCELMT in test 134, it remains unchanged. Therefore, if the collective stick drive motor is pulling too much current, the motor command signal (manifested as FORCE in the program) is faded out as a function of D until the problem no longer exists.

If step 126 subsequently determines MOTORCURR is below CURRLMT, step 138 increments FOR- CELMT by value C. Step 140 then determines if FORCELMT is greater than MAXFORCE. MAXFORCE is the maximum value of motor drive command (FORCE) which will keep the motor current draw (MOTORCURR) below the safe operating level (CURRLMT). If FORCELMT is greater than MAXFORCE, step 142 sets FORCELMT equal to MAXFORCE. If not, FORCELMT remains unchanged and test 134 compares FORCE with FORCELMT. Therefore, steps 138–142 fade FORCE in as a function of C once it is determined the motor is no longer drawing too much current.

Step 144 defines MOTOR CMD (provided on line 44 of FIG. 1) as equal to FORCE and the motor command routine is exited at point 146.

Although shown in terms of a software flowchart, the invention may also be implemented with dedicated digital or analog hardware. In fact, the invention has only been implemented as software algorithms such as those disclosed in U.S. Pat. Nos. 4,270,168 and 4,564,908, which are hereby incorporated herein by reference. The equivalence between analog, dedicated digital and software is illustrated (in a different context) in U.S. Pat. No. 4,294,162.

Figure 3:
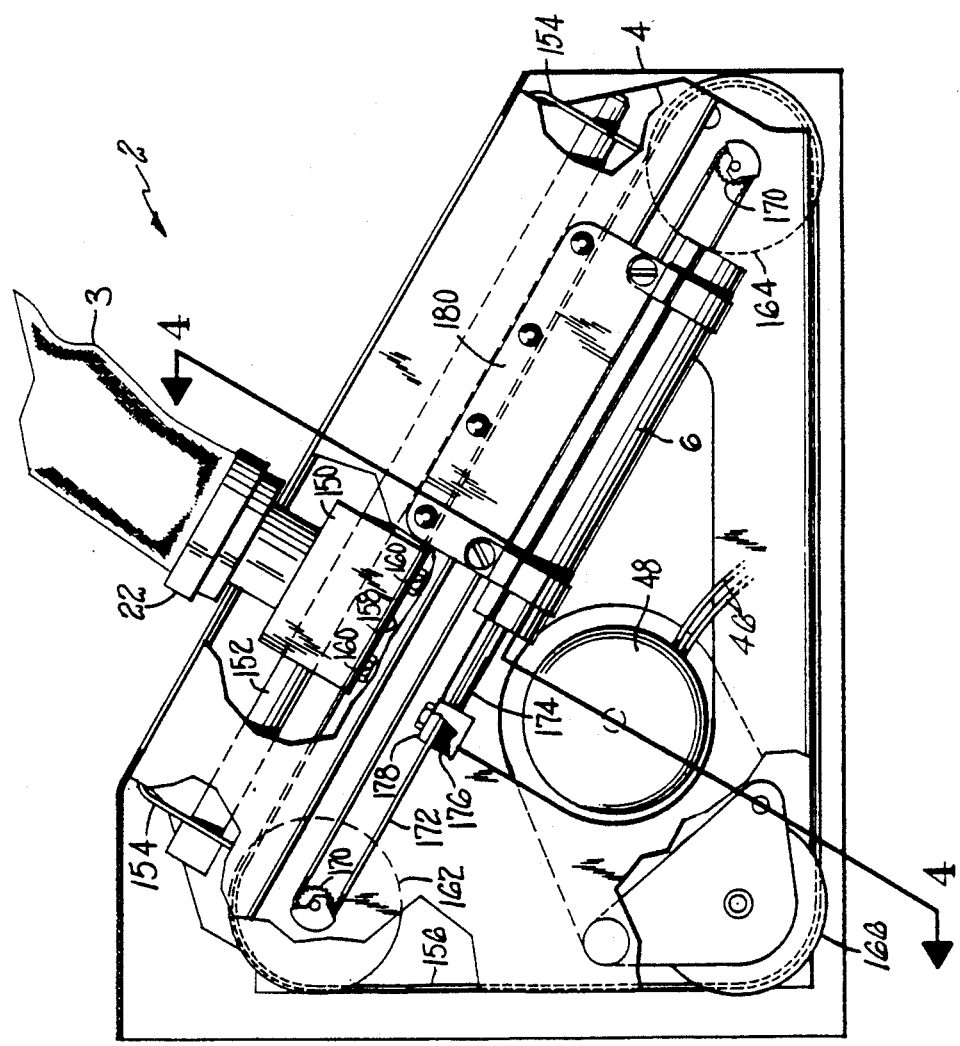
FIG. 3 is a side view partly broken away and partly in section of a motorized collective control stick in accordance with the present invention.

Referring now to FIG. 3 the grip 3 is mounted on a bearing block 150 having two bores lined with bearings which receive and ride on a pair of dual shafts 152 that are mounted on brackets 154 attached to the collective control box 4. The bearing block 150 is driven along the shafts 152 by a toothed drive belt 156 which is attached to the bearing block with a bracket 158 and bolts 160. Drive belt 156 rides on three toothed pulleys 162–166. Motor 48 drives pulley 166 with a belt-pulley arrangement as shown in FIG. 1 and described hereinafter. The motor 48 receives command signals on input leads 46. Pulleys 162–166 have toothed hubs 170, that engage with a drive belt 172. The core of LVDT 6 is attached to a rod 174 which is secured to the belt 172 by clamp 176 and nut 178. The LVDT 6 is mounted to control box 4 by a bracket 180.

Figure 4:
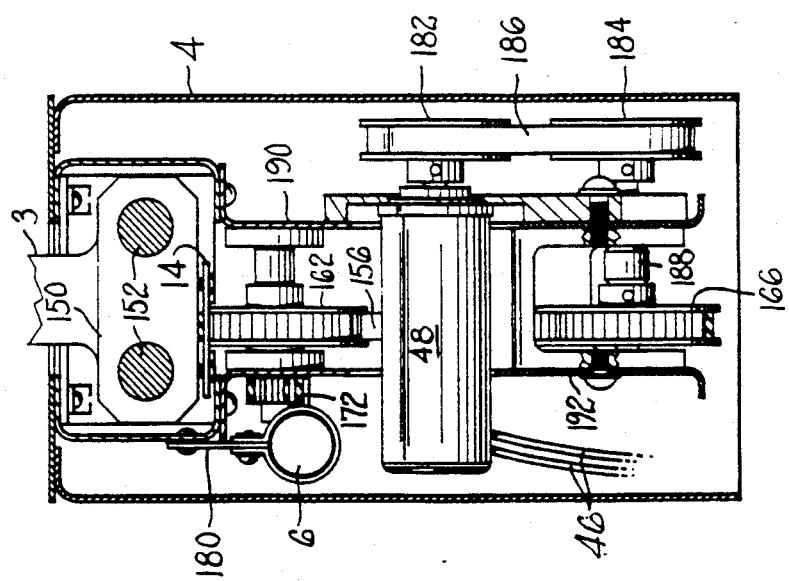
FIG. 4 is a sectional view taken along line 4—4 in FIG. 3.

Referring now to FIG. 4 a toothed pulley 182 is secured to the shaft of drive motor 48 and drives a toothed pulley 184 using a belt 186. Pulley 184 is connectably attached to pulley 166 via a shaft (not visible) which is disposed within a barrel 188. The motor and pulleys described hereinbefore are mounted on brackets 190, 192 which are in turn mounted to control box 4.

Figure 5:
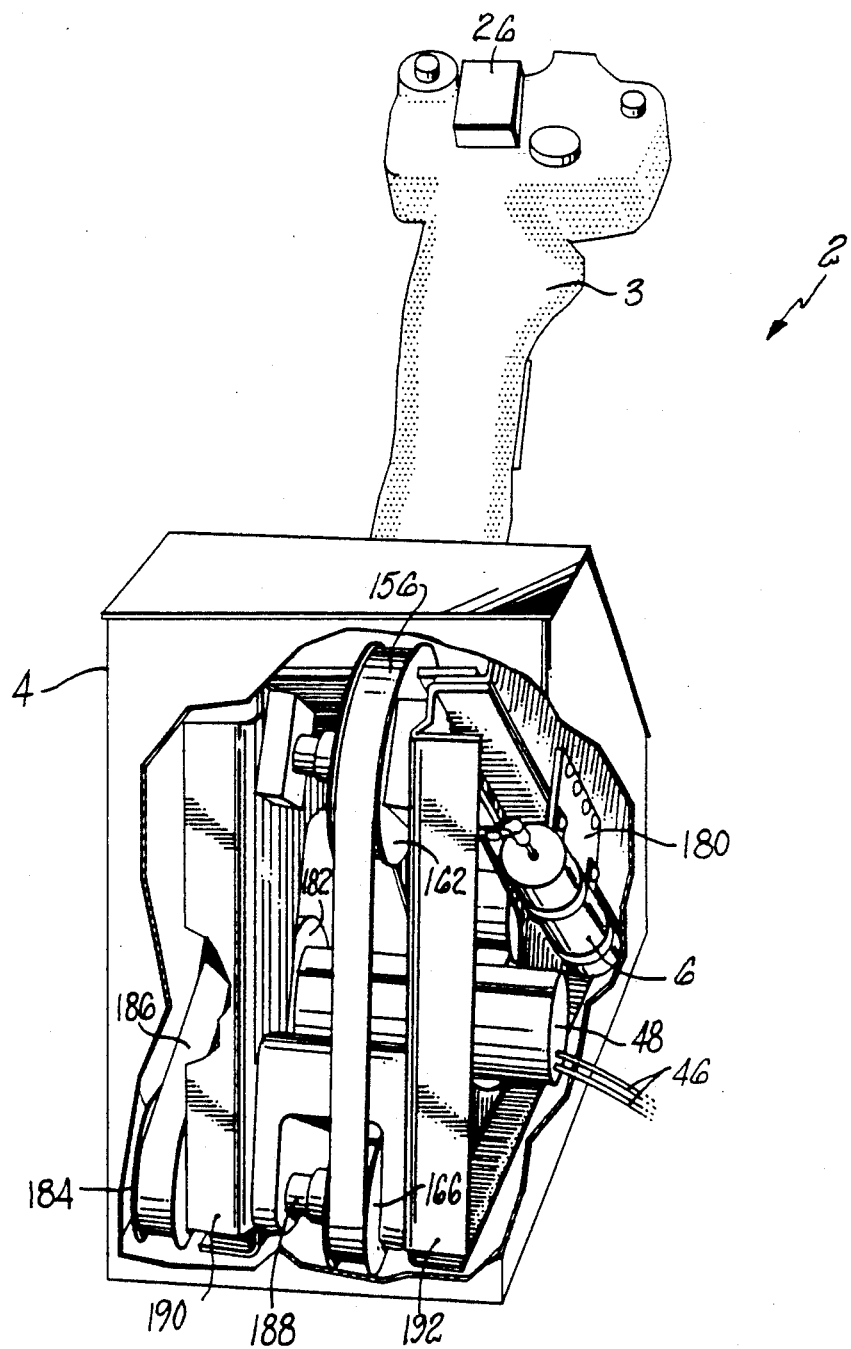
FIG. 5 is a perspective view partly broken away and partly in section in accordance with the present invention.

Referring now to FIGS. 4 and 5, motor 48 is shown connected to the pulley 182 which drives the belt 186 to turn the pulley 184 that is connected to the pulley 166 which drives the belt 156 around the pulley 162. The linear differential transformer 6 is mounted on the bracket 180. Brackets 190, 192 hold all of the above in place in control box 4.

Thus although the invention has been shown and described with respect to exemplary embodiments thereof, it should be understood by those skilled in the art that the foregoing and various other changes, omissions and additions may be made therein and thereto without departing from the spirit and the scope of the invention.

We claim:

1. A collective control system for determining the collective pitch of the rotor of a helicopter comprising:
   a motorized collective control stick;
   force means for providing a force signal indicative of the force applied to said collective control stick by the operator;
   position means for providing a position signal indicative of the position of said collective control stick;
   collective signal processing means responsive to said force signal for providing a motor drive signal to position said collective control stick where desired by the operator as manifested by said force signal; and
   controller means responsive to said position signal for controlling the rotor collective pitch.

2. A collective control system according to claim 1, wherein said signal processing means is responsive to the rate of change of said position signal to attenuate said motor drive signal as a direct function of the magnitude of the rate of change of said position signal.

3. A collective control system for determining the collective pitch of the rotor of a helicopter comprising:
   a multi-axis control stick for providing a first command signal indicative of desired collective pitch;
   a motor driven collective control stick for providing a second command signal indicative of desired collective pitch;
   position means for providing a position signal indicative of the position of said motor driven collective control stick;
   signal processing means for providing a motor drive signal responsive to either said first command signal or said second command signal to position said motor driven collective control stick; and
   controller means responsive to said position signal for controlling the rotor collective pitch.

4. A collective control system according to claim 3, further characterized by:
   force means for providing a force signal indicative of the force applied to said collective control stick by the operator; and
   wherein said second command signal is indicative of said force signal.

5. A collective control system according to claim 3, wherein said signal processing means is responsive to the rate of change of said position signal to attenuate said motor drive signal as a direct function of the magnitude of the rate of change of said position signal.

6. A collective control system according to claim 3, further comprising switch means engagable by the operator for commanding said signal processing means to be responsive to said second command signal.

7. A collective control system according to claim 1, further comprising:
   flight control computer means responsive to a dynamic flight condition of the helicopter for providing a signal parameter indicative of said flight condition; and
   wherein said signal processing means comprises means for adjusting said motor drive signal in response to said signal parameter.

8. A collective control system according to claim 7, further comprising:
   rotational means for providing a rotational rate signal indicative of the change in rotational attitude of the helicopter; and
   wherein said flight control computer means provides said signal parameter indicative of said rotational rate signal.

9. A collective control system according to claim 1, further comprising:
   current detection means for providing current signal indicative of the amount of current drawn by said motorized control stick; and current limiting means responsive to said current signal for attenuating said motor drive signal.

10. A collective control system according to claim 1, further comprising:

position limiting means responsive to said position signal for attenuating said motor drive signal.

11. A control for a helicopter, comprising:

a collective control stick;

means for providing a force signal indicative of the force applied to said collective stick by an operator;

means responsive to said force signal for computing a motor drive signal;

bearing means, connectably attached to one end of said collective stick, for providing a smooth sliding surface;

rod means, which remains stationary with respect to the helicopter frame, for slideably engaging with said bearing means;

a drive motor having an output shaft and responsive to said motor drive signal;

a drive belt connectably attached to said bearing means for driving said bearing means along said rod means; and pulley means connectably attached to said output shaft and engaged with said drive belt whereby said drive motor drives said bearing means along said rod means.

* * * * *